United States Patent
Hibbard (10) Patent No.: US 8,515,218 B2
(45) Date of Patent: Aug. 20, 2013

(54) LIGHT REDIRECTION SYSTEM AND METHODS OF FORMING SAME

(76) Inventor: Kevin Hibbard, Hermitage, TN (US)

( * ) Notice: Subject to any disclaimer, the term of this patent is extended or adjusted under 35 U.S.C. 154(b) by 62 days.

(21) Appl. No.: 12/914,427

(22) Filed: Oct. 28, 2010

(65) Prior Publication Data

US 2012/0106892 A1    May 3, 2012

(51) Int. Cl.
*G02B 6/12* (2006.01)

(52) U.S. Cl.
USPC ............................................. 385/14; 362/555

(58) Field of Classification Search
USPC .......................................... 385/14; 362/555
See application file for complete search history.

(56) References Cited

U.S. PATENT DOCUMENTS

| | | |
|---|---|---|
| 3,437,803 A | 4/1969 | Seitz |
| 4,483,585 A | 11/1984 | Takami |
| 4,556,280 A | 12/1985 | Bagby |
| 4,556,930 A | 12/1985 | Mori |
| 4,585,298 A | 4/1986 | Mori |
| 4,643,524 A | 2/1987 | Mori |
| 4,699,448 A | 10/1987 | Mori |
| 4,770,484 A | 9/1988 | Mori |
| 4,842,356 A | 6/1989 | Mori |
| 4,984,880 A | 1/1991 | Mori |
| 5,162,968 A | 11/1992 | Neiger |
| 5,548,676 A | 8/1996 | Savage, Jr. |
| 5,573,017 A * | 11/1996 | Post .............................. 132/275 |
| 5,722,757 A * | 3/1998 | Chien ........................... 362/555 |
| 2010/0014822 A1* | 1/2010 | Fine et al. ..................... 385/129 |

* cited by examiner

*Primary Examiner* — Eric Wong
*Assistant Examiner* — Mary El Shammaa
(74) *Attorney, Agent, or Firm* — Pitts & Lake, P.C.

(57) ABSTRACT

Light redirection systems and methods including an optical fiber having first and second ends, an optical element mounted to each of the first and second ends to direct light into and out of the optical fiber, respectively, and a mounting element to mount the optical fiber to an article of apparel such that the optical fiber is invisible to an outside of the article, and the optical elements are visible to the outside from opposing sides of the article, respectively.

11 Claims, 6 Drawing Sheets

LIGHT REDIRECTION SYSTEM AND METHODS OF FORMING SAME

BACKGROUND OF THE INVENTION

1. Field of Invention

The present general inventive concept relates generally to a light redirection system to create an optical illusion, and more particularly, to a light redirection system capable of redirecting light around articles of apparel or other articles to create an optical illusion of light passing through the article, and methods of forming the same.

2. Description of the Related Art

Many different kinds of special effects devices have been developed to create optical illusions. Optical illusions generally result in a false or deceptive visual impression that can be created by manipulation of light to create an image that appears to have an effect that it does not really have or something that appears different than it actually is. Some of the known devices include highly sophisticated apparatus, such as mirrors, polarizing devices, and lenses, to manipulate light to create an optical illusion. For example, a lenticular type of device in which a pattern of lenses is employed to create a motion or depth effect is known, including semicylindrical lenses and semispherical lenses.

In the field of wearing apparel, garments have been developed in various styles, patterns and colors, typically with the intent to produce a desired visual effect. That effect has sometimes been one of form flattering or form altering attire, such as fitted shirts and corsets, or of body hiding such as camouflage. Other effects have been related to expressions of interests or points of view such as in the use of words or artistic patterns or to novelty such as in costumes.

For example, horizontal, vertical, and diagonal line and stripe patterns have been used, as have been geometric shapes, plaids, and checkerboard shapes. Patterns in the shapes of animate and inanimate objects as well as abstract art and symbols have been used to create specific impacts. Contrasts from the darkest darks to the lightest lights and patterns mixing black, white and colors have been employed for the purpose of creating various optical design results.

However, a concept that has yet to be developed is that of providing an optical redirection system capable of being installed or incorporated into various articles of apparel such as gloves, hats, clothing, or any other type of article for specific purposes of redirecting light around the article to create an optical illusion of light passing directly through the article, which can result in a special effect visual impression of holes being present through the wearer of the articles.

BRIEF SUMMARY OF THE INVENTION

The present general inventive concept provides systems and methods capable of being installed or incorporated into various articles of apparel for specific purposes of redirecting light around the article to create an optical illusion of light passing through the article, resulting in a special effect visual impression that can create a bodily appearance modification exhibiting the presence of holes through the wearer of the articles.

Additional features and embodiments of the present general inventive concept will be set forth in part in the description which follows and, in part, will be obvious from the description, or may be learned by practice of the general inventive concept.

Example embodiments of the present general inventive concept can be achieved by providing a light redirection system including an optical fiber having first and second ends, an optical element mounted to each of the first and second ends to direct light into and out of the optical fiber, respectively, and a mounting element to mount the optical fiber to an article of apparel such that the optical fiber is invisible to an outside of the article, and the optical elements are visible to the outside from opposing sides of the article, respectively.

The optical fiber can wrap around a periphery of the article and can extend between the opposing sides to direct light from one side to the other.

The first and second ends of the optical fiber can be bent at predetermined angles with respect to a longitudinal axis of the optical fiber.

The light redirection system can further include an elastomeric layer formed on the optical fiber to facilitate bending of the optical fiber, to enhance optical efficiency of the optical fiber, and to chemically insulate the optical fiber. The elastomeric layer may be configured such that it does not contact the bends of the first and second ends.

The mounting element can be mended to the article using a chemical mending process, or by sewing or other attachment means.

The optical elements can be formed of aqua gems, and the aqua gems can be glued to the ends of the optical fiber such that the aqua gems expand to a predetermined size.

Example embodiments of the present general inventive concept can also be achieved by providing a method of forming a light redirection system, including providing an optical fiber having first and second ends, bending the first and second ends such that the ends are positioned at predetermined angles with respect to the longitudinal axis of the optical fiber, installing first and second optical elements to the first and second ends, respectively, to direct ambient light into and out of the optical fiber, and mounting the optical fiber to an article of apparel such that the optical fiber is invisible to an outside of the article, and the optical elements are visible to the outside from opposing sides of the article, respectively.

The operation of installing first and second optical elements can include gluing the first and second optical elements to the first and second ends, respectively, such that the first and second optical elements expand in size upon being exposed to the glue.

BRIEF DESCRIPTION OF THE SEVERAL VIEWS OF THE DRAWINGS

The above-mentioned features of the present general inventive concept will become more clearly understood from the following detailed description in conjunction with the drawings, in which.

DETAILED DESCRIPTION OF THE INVENTION

Reference will now be made to various embodiments of the present general inventive concept, examples of which are illustrated in the accompanying drawings, wherein like reference numerals refer to like elements throughout. The following description of the various example embodiments is merely exemplary in nature and is in no way intended to limit the present general inventive concept, its application, or uses. The example embodiments are merely described below in order to explain the general inventive concept by referring to the figures.

The following detailed description and claims may recite various descriptive terms such as front, back, horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

The present general inventive concept provides systems and methods capable of being installed or incorporated into various articles of apparel for specific purposes of redirecting light around the article to create an optical illusion of light passing through the article. For example, in some embodiments, the present general inventive concept can provide a light redirection system that can create a bodily appearance modification exhibiting the presence of holes through various locations of the wearer of the articles.

Figure 1:
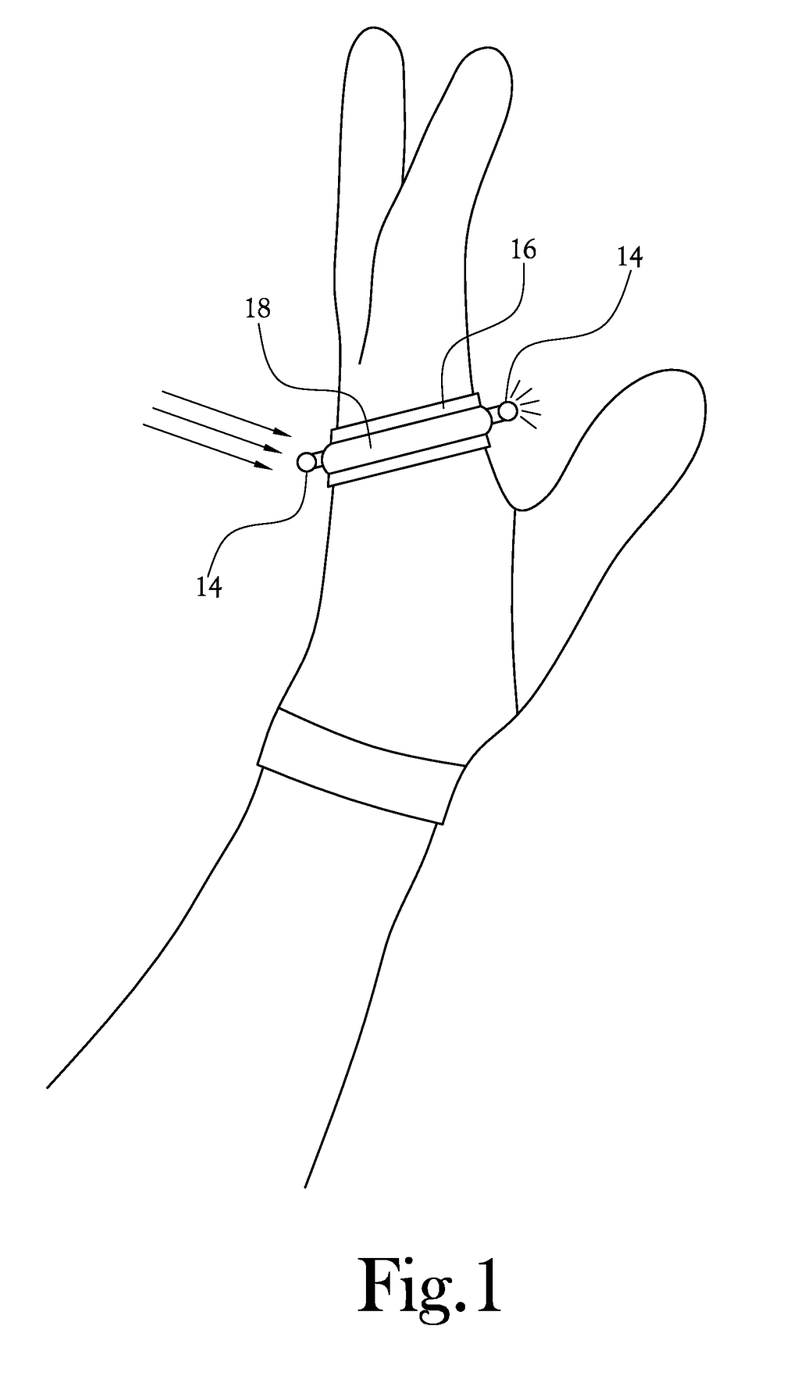
FIG. 1 is a side view of an application of an exemplary light redirection system implemented in an article of apparel, namely a glove, according to an example embodiment of the present general inventive concept.

FIG. 1 illustrates an application of an exemplary light redirection system implemented in an article of apparel, such as a glove 20, according to an example embodiment of the present general inventive concept. As illustrated in FIG. 1, the exemplary light direction system functions to direct light rays, such as ambient light, from an incident position on one side of the glove 20, such as the back side of glove 20 in FIG. 1, around the perimeter of the glove 20, to a front side of the glove 20 where the light can then be emitted from the other end of the system, to provide an optical illusion of light passing directly through the article when viewed from the front of the glove 20, for example as illustrated in FIG. 2.

Figure 2:
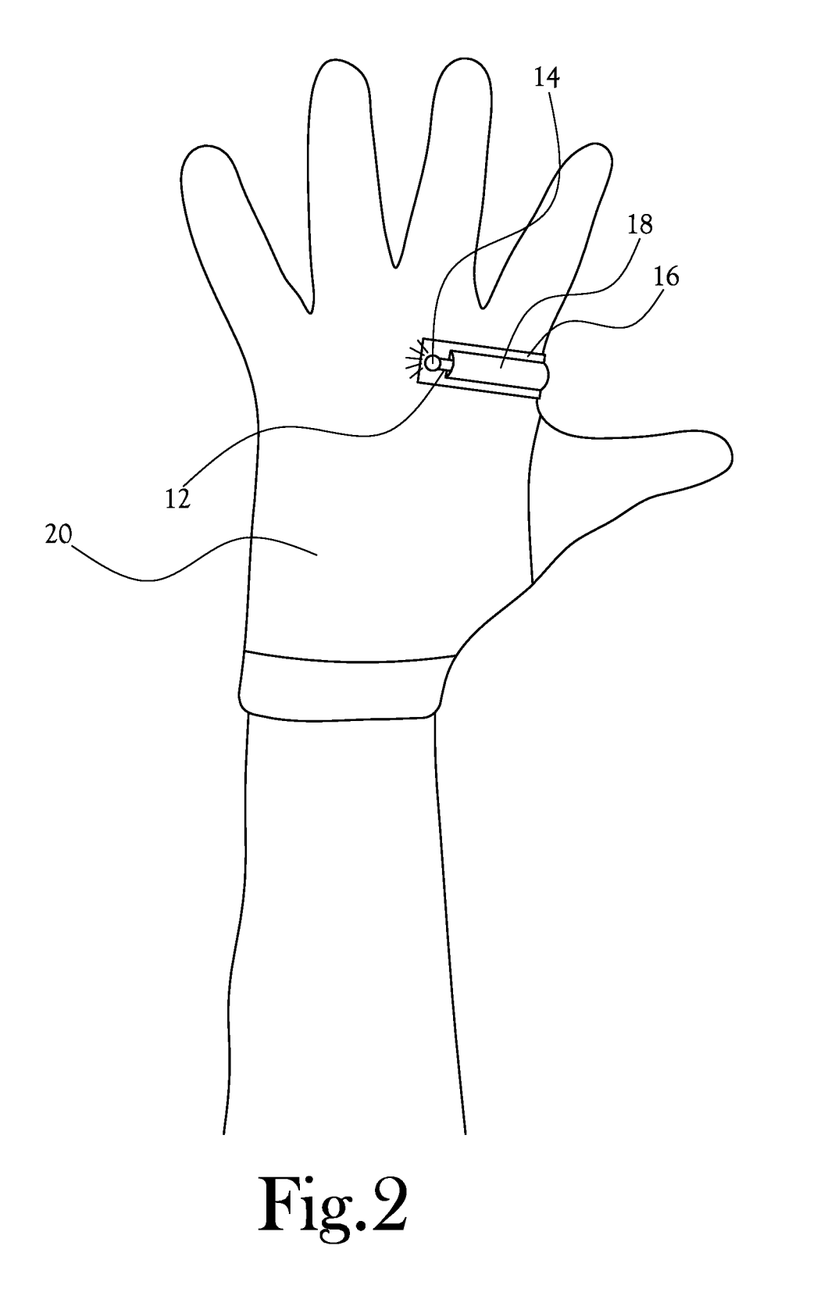
FIG. 2 is a frontal view of the exemplary light redirection system of FIG. 1.

FIG. 2 is a frontal view of the exemplary light redirection system of FIG. 1. Note that example embodiments of the present general inventive concept may be illustrated and described for use with a particular article of apparel, such as glove 20, but the present general inventive concept is not limited to any particular article of apparel, nor is it limited to articles being worn by a person or any particular type of article. For example, the present general inventive concept is not limited to application with Halloween costumes and articles, but may be used in connection with any number of articles and objects where redirection of light around the article is desired to achieve an optical illusion of light passing directly through the object, for example to provide an illusion that holes exist in the object when viewed from one side of the object.

Figure 3:
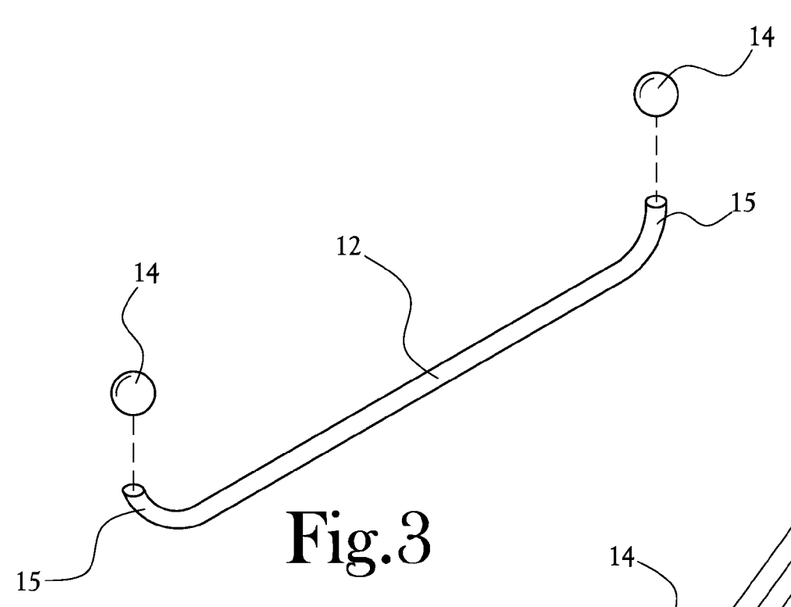
FIG. 3 is an assembly view of an exemplary light redirection system constructed in accordance with an example embodiment of the present general inventive concept.

FIG. 3 is an assembly view of an exemplary light redirection system constructed in accordance with an example embodiment of the present general inventive concept.

Figure 4:
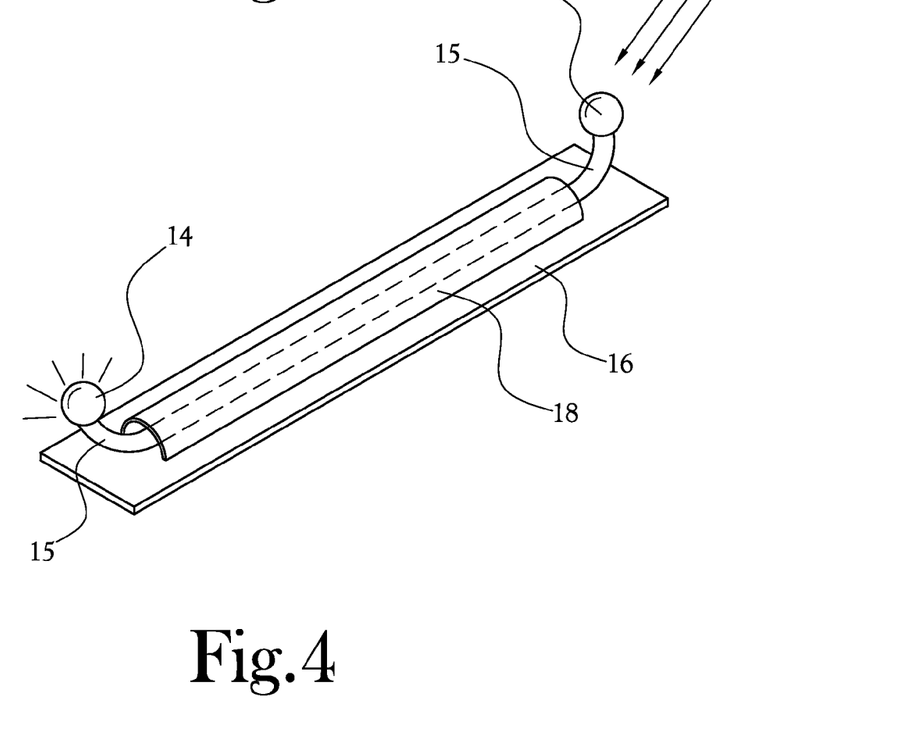
FIG. 4 is a perspective view of an exemplary light redirection system incorporated into a mounting element according to an example embodiment of the present general inventive concept.

As illustrated in FIG. 3, the light redirection system includes an optical conduit, or optical fiber 12, and a pair of optical elements 14 mounted on each end 15 of the optical fiber 12. The optical fiber 12 may take the form of a thin, flexible, transparent fiber that acts as a waveguide, or light pipe, to transmit light between the two ends 15 of the fiber. Due to the flexibility of the optical fiber 12, the ends 15 can be configured in shape and size, as suited, to form a shape as depicted in the examples of FIGS. 3 and 4. Many different sizes of optical fibers may be used. By way of example, but not by way of limitation, the optical fiber 12 may be in the range of 0.25 to 3 mm in diameter.

The optical elements 14 may take the form of a suitably sized optical crystal, lens, or other optical element having a spherical shape element, although the present general inventive concept is not limited to any particular shape or material for the optical element. For example, it is possible to configure the optical elements using aqua-gems formed of a polymer material that absorbs, stores, and releases water. It is also possible to configure the optical elements using other types of crystal gems, glass, and/or polymers.

Referring to FIG. 3, the optical elements 14 can be mounted to the ends 15 of the optical fiber 12 by way of heating or gluing the optical elements 14 to the ends of the optical fiber 15, although the present general inventive concept is not limited to any particular means of attaching the optical elements 14 to the ends of the optical fiber 12. In one embodiment, it is possible to use an amount of liquid fusion material, such as a clear urethane glue, to glue the optical elements 14 to the ends 15 of the optical fiber 15. In the case where aqua gems are used as the optical elements 14, it is possible that the chemical make-up and liquidity of the fusion glue material can cause the aqua gems to expand over time to create a larger refraction surface area for the optical elements 14 as the liquid fusion material sets, enabling the optical elements 14 to throw-off, or emit, more light. Other types of glue can also be used, such as clear gel tacky glue, although the present general inventive concept is not limited to any particular type of glue material.

In some embodiments, the clear transparent nature of urethane glue can function to create an optical bridge between the optical element 14 and fiber 12, improving transmission efficiency of the light redirection system. It is also possible to place a coating of liquid fusion material over the optical elements 14 such that once the liquid fusion material sets, an optical shell structure is provided to cover the outer surface of the optical elements, adding to the refraction rate of the optical elements and improving performance of the light redirection system. It is also possible to sand/polish the end surfaces of the optical fiber to ensure a clean fit between the optical elements 14 and the optical fiber 12 for maximum light transmission and to provide optimum optical coupling therebetween.

The orientation of the optical elements 14 with respect to the ends 15 of the optical fiber 12, i.e., the angular and circumferential relationship between the optical elements 14 and the ends 15 of the optical fiber 12, can be adjusted during the time the glue material is setting and while the aqua gems are expanding, to control the angles of refraction and to maximize the amount of light, and direction thereof, being emitted from the optical elements 14. It has been found that an elastomeric layer (not illustrated) may be provided over the length of the optical fiber 12 to protect the optical fiber from chemical exposure, and can facilitate shape memory qualities of the optical fiber when the optical fiber is bent. The elastomeric layer can be provided over the entire length of the optical fiber 12, except for the bend portions 15, to enhance transmission efficiency of light through the optical fiber with respect to light directed into one end of the optical fiber via a respective optical element 14 and emitted from the other end of the optical fiber 12 via the other respective optical element 14.

FIG. 4 is a perspective view of an exemplary light redirection system incorporated into a mounting element according to an example embodiment of the present general inventive concept.

As illustrated in FIG. 4, it is possible to attach the optical fiber 12 to a mounting element 16, such as a piece of cloth or other suitable material, which can be attached to an article of apparel by way of sewing, gluing, mending, or other suitable means. The mounting element 16 can include a securing element 18 to secure the optical fiber 12 to the mounting element 16 in an orientation to direct the optical elements 14 in a substantially upright position relative to the mounting element 16. In one embodiment, the securing element 18 may take the form of twist ties to secure and support the optical fiber 12 and elements 14 relative to the mounting element 16. The mounting element 16/optical fiber 12 assembly can then be attached to an article of apparel, such as a glove, hat, coat, mask, costume, or other article to conform or wrap the optical fiber 12 around a peripheral surface of the article such that one of the optical elements 14 is located at a back surface of the article, and the other optical element 14 is located at an opposing (e.g., front) surface of the article.

Figure 5:
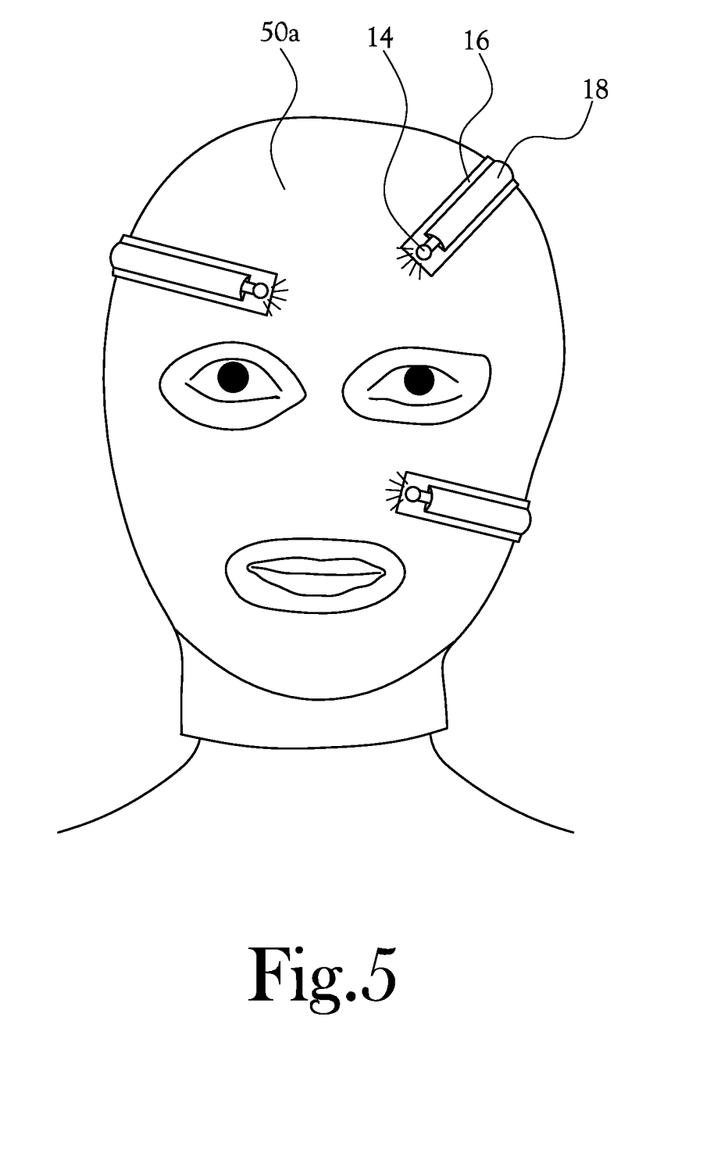
FIG. 5 is a front view of an application of an exemplary light redirection system implemented in an article of apparel, namely a mask, according to an example embodiment of the present general inventive concept.

FIG. 5 is a front view of an application of an exemplary light redirection system implemented in an article of apparel, namely a mask, according to an example embodiment of the present general inventive concept.

Figure 6:
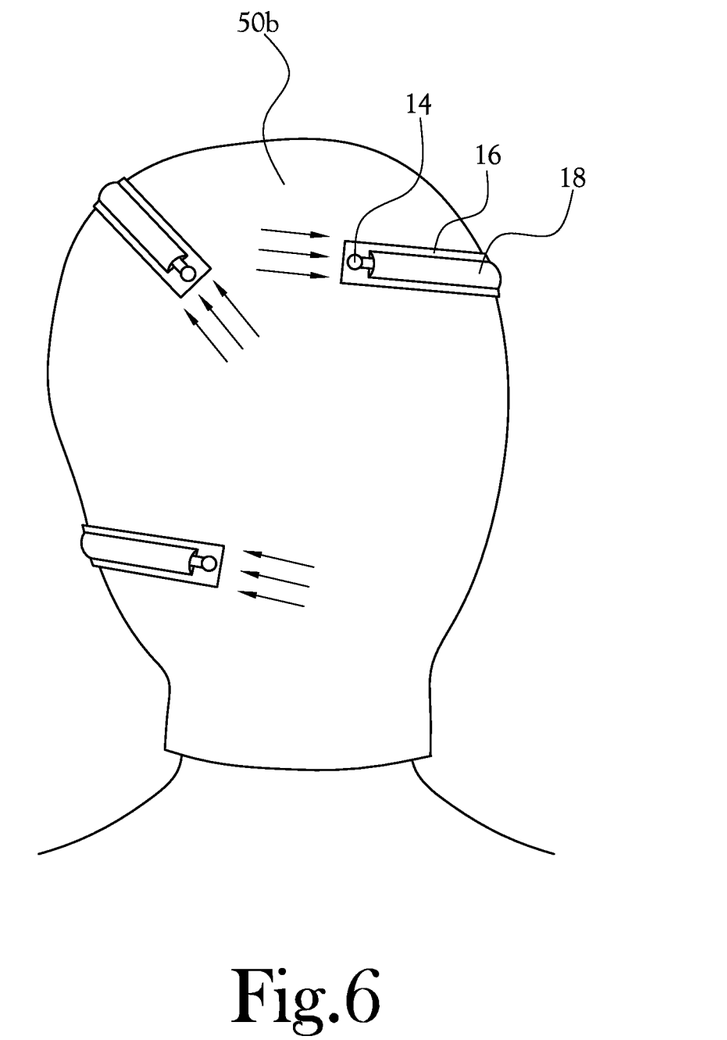
FIG. 6 is a rear view of the exemplary light redirection system of FIG. 5.

FIG. 6 is a rear view of the exemplary light redirection system of FIG. 5.

Referring to FIGS. 5 and 6, the mounting element 16/optical fiber 12 assembly, which is flexible, can be mounted to the mask such that one end of the can be mounted to a mask such that one end of the assembly is located at a front surface 50a of the mask, and the other end is located at an opposing back surface 50b of the mask. In this way, when ambient or directed light is directed toward the back surface 50b of the mask, the light can be directed into a respective optical element 14 mounted on the back surface of the mask 50b, as indicated by the direction arrows of FIG. 6. The incident light can then be directed around the peripheral surface of the mask via the optical fiber 12 wrapped therearound, with results being that the light can be emitted by the optical element 14 positioned on the front surface of the mask 50a, as indicated by the emitted rays of FIG. 5.

By directing the light around the periphery of the mask, in a passive manner without external power, it is possible to achieve an optical illusion of light passing directly through the object to a viewer positioned looking toward the front of the mask, providing an illusion that holes exist in the object even though no such holes exist.

The articles of apparel used for mounting the light redirection system can be part of a larger costume assembly. For example, the glove 20 and mask 50a, 50b can be configured as an undergarment, and a larger garment article, having openings designed to correspond to the optical elements 14, can be provided as an over-garment to conceal any evidence that the undergarment, and associated optical fiber 12 and mounting element 16, exist.

Figure 7:
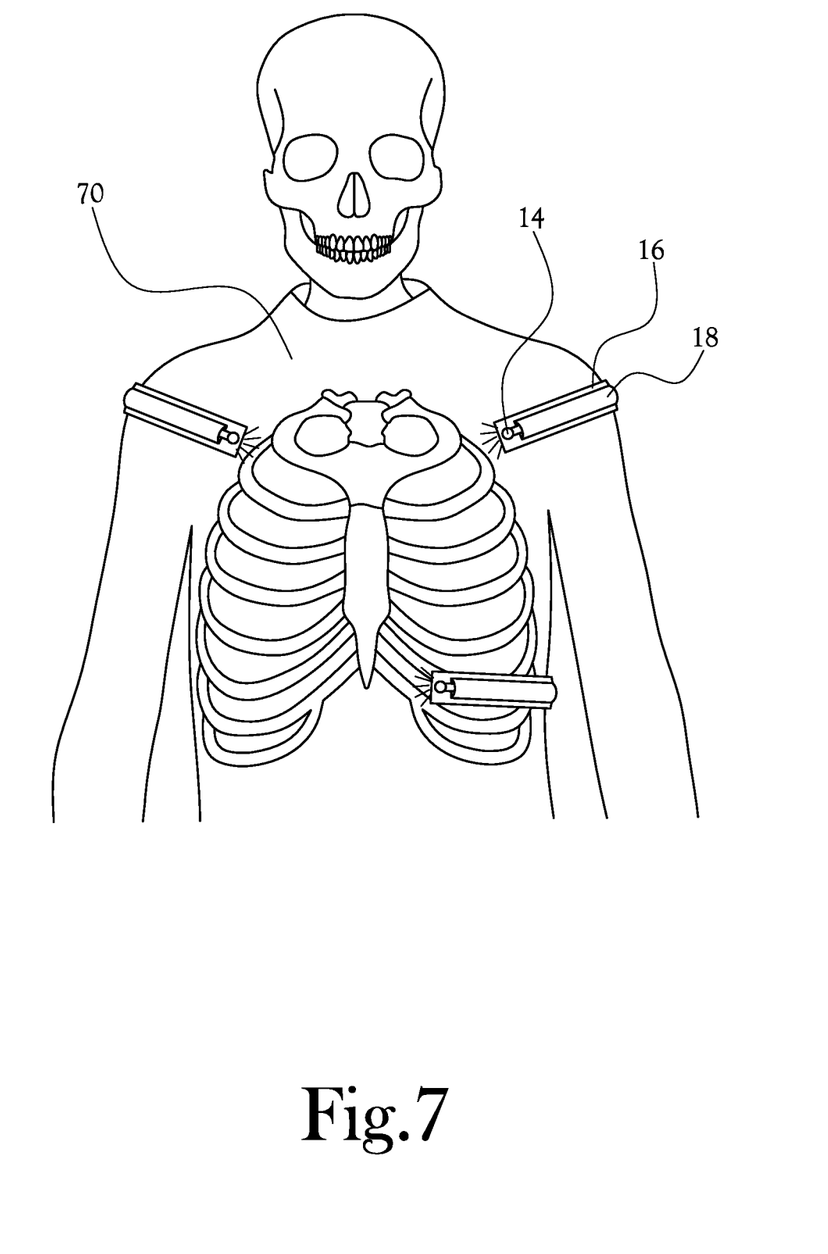
FIG. 7 is a front view of an application of an exemplary light redirection system implemented in an article of apparel, namely a shirt, according to an example embodiment of the present general inventive concept.

FIG. 7 is a front view of an application of an exemplary light redirection system implemented in an article of apparel, namely a shirt 70, according to another example embodiment of the present general inventive concept.

In some embodiments, it is possible to mount multiple optical elements 14 together, e.g. one on top of the other, to achieve desired refractive and directional effects. For example, it is possible to place a drop of resin glue on one tip of the optical fiber, after an optical element has been mounted on another end of the optical fiber, and then place an optical element 14 on the glued tip and manipulate the optical element 14 as the glue sets, all the while light is being directed into the optical element at the other end, which manipulation can achieve maximum transmission efficiency based on the size and shape of the respective elements. In this way, it is also possible to repeat this process for subsequent gems so as to stack one gem on top of another using glue, and to then manipulate the gems as the glue is setting and as the gems are expanding, to achieve a desired effect. The assemblies can be configured in any length to meet the peripheral requirements of a particular application, and the flexible nature of the optical fiber enables the assembly to wrap around a variety of articles for different applications.

While the present general inventive concept has been illustrated by description of example embodiments and while the illustrative embodiments have been described by referring to the drawings, it is not the intention of the applicant to restrict or in any way limit the scope of the appended claims to the illustrative examples. It is noted that numerous variations, modifications, and additional embodiments are possible, and accordingly, all such variations, modifications, and embodiments are to be regarded as being within the spirit and scope of the present general inventive concept. The present general inventive concept in its broader aspects is therefore not limited to the specific details, representative apparatus and methods, and illustrative examples illustrated and described. Accordingly, departures may be made from such details without departing from the spirit or scope of applicant's general inventive concept.

What is claimed is:

1. A light redirection system, comprising:
an optical fiber having first and second ends;
an optical element mounted to each of the first and second ends to direct ambient light into and out of the optical fiber, the first and second ends of the optical fiber being bent at predetermined angles with respect to a longitudinal axis of the optical fiber; and
a mounting element to mount the optical fiber to an article of apparel such that the optical fiber is invisible to an outside of the article, and the optical elements are visible to the outside from opposing sides of the article, respectively, such that the ambient light incident on each of the opposing sides of the article is emitted at the other of the opposing sides.

2. The light redirection system of claim 1, wherein the optical fiber wraps around a periphery of the article and extends between the opposing sides to direct light from one side to the other.

3. The light redirection system of claim 1, further comprising:
an elastomeric layer formed on the optical fiber to facilitate bending of the optical fiber, to enhance optical efficiency of the optical fiber, and to chemically insulate the optical fiber.

4. The light redirection system of claim 3, wherein the elastomeric layer does not contact the bends of the first and second ends.

5. The light redirection system of claim 1, wherein the mounting element is mended to the article using a chemical mending process.

6. The light redirection system of claim 1, wherein the optical elements are aqua gems, and the aqua gems are glued to the ends of the optical fiber to expand the aqua gems to a predetermined size.

7. A method of forming a light redirection system, comprising:
providing an optical fiber having first and second ends;
bending the first and second ends such that the ends are positioned at predetermined angles with respect to the longitudinal axis of the optical fiber;
installing first and second optical elements to the first and second ends, respectively, to direct ambient light into and out of the optical fiber; and mounting the optical fiber to an article of apparel such that the optical fiber is invisible to an outside of the article, and the optical elements are visible to the outside from opposing sides of the article, respectively, such that ambient light incident on each of the opposing sides of the article is emitted at the other of the opposing sides.

8. The method of claim 7, wherein the operation of installing first and second optical elements comprises:
gluing the first and second optical elements to the first and second ends, respectively, such that the first and second optical elements expand in size upon being exposed to the glue.

9. The method of claim 7, further comprising:
coating a length of the optical fiber between the first and second ends with an elastomeric coating such that the elastomeric coating does not contact the first and second bends.

10. The light redirection system of claim 1, whereby light is directed from the optical element mounted on the first end to the optical element mounted on the second end and from the optical element mounted on the second end to the optical element mounted on the first end.

11. A light redirection system, comprising:
an article of apparel including a front layer and a rear layer;
an optical fiber having first and second ends, the first and second ends of the optical fiber being bent at predetermined angles with respect to a longitudinal axis of the optical fiber;
a mounting element to mount the optical fiber to the article such that the optical fiber is invisible to an outside of the article and the first and second ends are mounted to the front and rear layers, respectively; and
an optical element mounted to each of the first and second ends by a liquid fusion material forming an optical bridge between the optical element and the optical fiber, each optical element viewable from the outside of the article, each optical element directing ambient light into and out of the optical fiber such that ambient light incident on the front layer is emitted at the rear layer, and ambient light incident on the rear layer is emitted at the front layer.

\* \* \* \* \*